US006938163B1

(12) United States Patent
Birkler et al.

(10) Patent No.: US 6,938,163 B1
(45) Date of Patent: Aug. 30, 2005

(54) TECHNIQUE FOR SECURELY STORING DATA WITHIN A MEMORY

(75) Inventors: Jörgen Birkler, Bara (SE); Magnus Svensson, Malmö (SE); Kristina Ahlgren, Malmö (SE); Lars Novak, Bjärred (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/525,230

(22) Filed: Mar. 14, 2000

Related U.S. Application Data

(60) Provisional application No. 60/139,636, filed on Jun. 17, 1999.

(51) Int. Cl.[7] ............................................... H04L 9/20
(52) U.S. Cl. ..................................... 713/193; 713/200
(58) Field of Search .................... 380/284, 2; 713/202, 713/193, 183, 200

(56) References Cited

U.S. PATENT DOCUMENTS

| | | | | |
|---|---|---|---|---|
| 4,453,074 A | * | 6/1984 | Weinstein | 705/66 |
| 4,801,787 A | | 1/1989 | Suzuki | 235/380 |
| 5,246,375 A | | 9/1993 | Goede | 434/236 |
| 5,408,082 A | | 4/1995 | Takagi et al. | 235/492 |
| 5,712,912 A | * | 1/1998 | Tomko et al. | 713/186 |
| 5,719,560 A | * | 2/1998 | Watkins | 340/5.5 |
| 5,742,035 A | | 4/1998 | Kohut | 235/380 |
| 5,745,555 A | | 4/1998 | Mark | 379/95 |
| 5,870,723 A | | 2/1999 | Pare, Jr. et al. | 705/39 |
| 6,088,450 A | * | 7/2000 | Davis et al. | 713/182 |

FOREIGN PATENT DOCUMENTS

| | | |
|---|---|---|
| JP | 63 159962 A | 7/1988 |
| WO | WO 00/07087 | 2/2000 |

OTHER PUBLICATIONS

ISR for PCT/EP00/04883 completed Aug. 30, 2000, Sep. 7, 2000, PCT/EPO.

"Protecting Secret Keys with Personal Entropy" by Carl Ellison et al., Future Generation Computer Systems, vol. 16, No . 4, Feb. 2000, pp. 311-318, XP004185843.

* cited by examiner

*Primary Examiner*—Gregory Morse
*Assistant Examiner*—Andrew Nalven
(74) *Attorney, Agent, or Firm*—Jenkens & Gilchrist, P.C.

(57) ABSTRACT

A technique for securely storing data within a memory is disclosed. In a preferred embodiment, the technique is realized by encrypting the data using a non-verifiable personal identifier, and then encrypting a reminder using the same non-verifiable personal identifier. The encrypted data and the encrypted reminder are then stored in the memory. The stored encrypted data and the stored encrypted reminder can only be correctly decrypted using the non-verifiable personal identifier. Also, a correctly decrypted reminder provides an indication of correctly decrypted data. The non-verifiable personal identifier is not stored in the memory so as to insure security of the system.

65 Claims, 3 Drawing Sheets

TECHNIQUE FOR SECURELY STORING DATA WITHIN A MEMORY

CROSS-REFERENCES TO RELATED APPLICATIONS

This Application for Patent claims the benefit of priority from, and hereby incorporates by reference the entire disclosure of, co-pending U.S. Provisional Application for Patent Ser. No. 60/139,636, filed Jun. 17, 1999.

FIELD OF THE INVENTION

The present invention relates generally to electronic storage systems and, more particularly, to a technique for securely storing data within a memory.

BACKGROUND OF THE INVENTION

The use of mobile phones and personal digital assistants (PDA's) is becoming more and more common in everyday life. That is, more and more people from every walk of life are using mobile phones and PDA's for business and/or pleasure, out of necessity or just for common convenience. In fact, due to the now ubiquitous nature of mobile phone and PDA usage, it is just as common for persons to carry his/her mobile phone and/or PDA as it is to carry a wallet or purse. Indeed, in some quarters it is becoming more common for persons to carry only a mobile phone and/or a PDA since these devices are becoming capable of performing more and more functions and offering more and more services. For example, mobile phones are now capable of providing Internet access and PDA's are now capable of sending and receiving electronic mail.

As the world becomes more and more reliant on digital communications and systems, it is expected that mobile phones and PDA's will become more and more useful. For example, the use of personal identification number (PIN) codes are becoming more and more common for verifying the identity of a user of a digital system such as, for example, a bank automatic teller machine (ATM). As more and more digital systems adopt the use of PIN codes for identity verification, the number of PIN codes that a user of these digital systems must remember increases, particularly since it is often recommended for security purposes that users use different PIN codes for different digital systems. As a result of this increase in the number of PIN codes that must be remembered, some users of mobile phones and PDA's have begun to store their PIN codes in digital read/write memory which is now incorporated within most of these devices. That is, some users of mobile phones and PDA's have begun storing their PIN codes in the digital read/write memory that is now incorporated within their mobile phones and PDA's, rather than trying to memorize all of the increasing number of PIN codes that must be used to gain access to a corresponding increasing number of digital systems.

Despite the apparent benefit of storing PIN codes in the digital read/write memory of mobile phones or PDA's, a security problem exists with this practice. That is, the digital read/write memory in existing mobile phones and PDA's is not capable of preventing unauthorized users from accessing PIN codes stored therein. The only way that PIN codes, or any other data, that are stored within the digital read/write memory of a mobile phone or PDA are truly secure is if the digital read/write memory can withstand four basic types of attack. Namely, these four basic types of attack include: 1.) when an attacker cannot read the content of the memory and does not know (before the attack) anything that has been stored in the memory; 2.) when an attacker can read the content of the memory but does not know (before the attack) anything that has been stored in the memory; 3.) when an attacker cannot read the content of the memory but does know (before the attack) at least one thing that has been stored in the memory; and 4.) when an attacker can read the content of the memory and does know at least one thing that has been stored in the memory. Thus, for PIN codes, or any other data, that are stored within the digital read/write memory of a mobile phone or PDA to be truly safe and secure, the memory has to be resistant to all the different types of attacks listed above.

In view of the foregoing, it would be desirable to provide a technique for securely storing data within a memory which overcomes the above-described inadequacies and shortcomings while also withstanding all of the above-described types of attacks.

OBJECTS OF THE INVENTION

The primary object of the present invention is to provide a technique for securely storing data within a memory in an efficient and cost effective manner.

The above-stated primary object, as well as other objects, features, and advantages, of the present invention will become readily apparent to those of ordinary skill in the art from the following summary and detailed descriptions, as well as the appended drawings. While the present invention is described below with reference to preferred embodiment(s), it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

SUMMARY OF THE INVENTION

According to the present invention, a technique for securely storing data within a memory is provided. In a preferred embodiment, the technique is realized by encrypting the data (e.g., one or more PIN codes) using a non-verifiable personal identifier, and then encrypting a reminder (e.g., some user-identifiable code) using the same non-verifiable personal identifier. The encrypted data and the encrypted reminder are then stored in the memory. The stored encrypted data and the stored encrypted reminder can only be correctly decrypted using the non-verifiable personal identifier. Also, a correctly decrypted reminder provides an indication of correctly decrypted data.

In accordance with other aspects of the present invention, the non-verifiable personal identifier is not stored in the memory. Examples of the non-verifiable personal identifier include alphanumeric characters and identifiable personal characteristic such as, for example, a human voice, a human fingerprint, and a human eye.

In accordance with further aspects of the present invention, the non-verifiable personal identifier is applied against the stored encrypted data and the stored encrypted reminder so as to decrypt the stored encrypted data and the stored encrypted reminder. The original data may then be provided to a user after being correctly decrypted using the using the non-verifiable personal identifier. For example, the original data may be displayed to a user or the original data may be announced to a user. Similarly, the original reminder may be provided to a user after being correctly decrypted using the using the non-verifiable personal identifier. For example, the original reminder may be displayed to a user or the original reminder may be announced to a user. A predetermined time period is beneficially required before applying another personal identifier against the stored encrypted data and the stored encrypted reminder for the purpose of decrypting the stored encrypted data and the stored encrypted reminder.

In accordance with still further aspects of the present invention, an identifier other than the non-verifiable personal identifier may be applied against the stored encrypted data and the stored encrypted reminder so as to incorrectly decrypt the stored encrypted data and the stored encrypted reminder. If such is the case, incorrect data may then be provided to a user after the encrypted data has been incorrectly decrypted using an identifier other than the non-verifiable personal identifier. For example, the incorrect data may be displayed to a user or the incorrect data may be announced to a user. Similarly, an incorrect reminder may be provided to a user after the encrypted reminder has been incorrectly decrypted using an identifier other than the non-verifiable personal identifier. For example, the incorrect reminder may be displayed to a user or the incorrect reminder may be announced to a user. A predetermined time period is again beneficially required before applying another personal identifier against the stored encrypted data and the stored encrypted reminder for the purpose of decrypting the stored encrypted data and the stored encrypted reminder.

The present invention will now be described in more detail with reference to exemplary embodiments thereof as shown in the appended drawings.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

Figure 1:
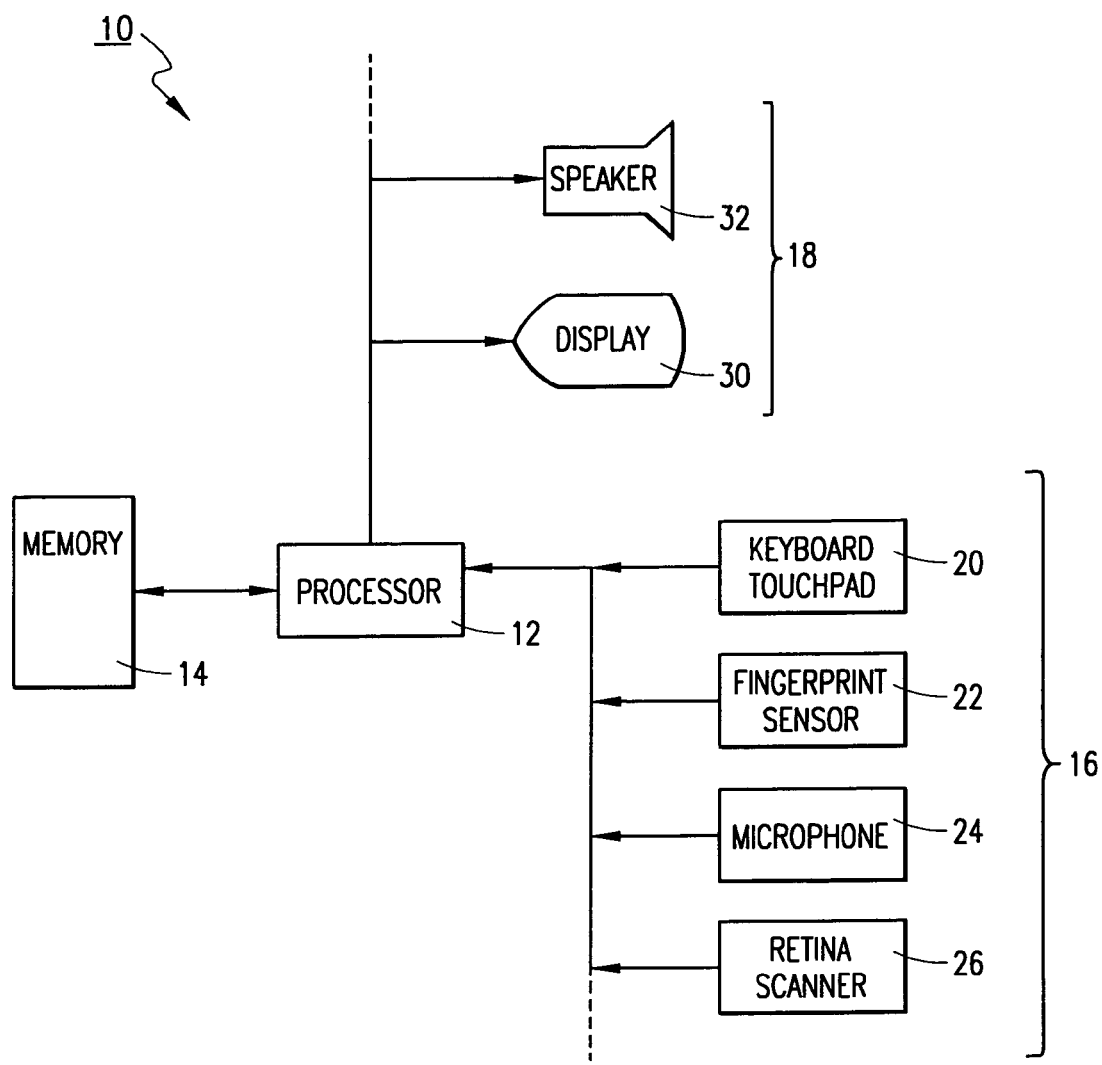
FIG. 1 is a schematic diagram of a system for securely storing data in a memory in accordance with the present invention.

Referring to FIG. 1, there is shown a system 10 for securely storing data in a memory in accordance with the present invention. The system 10 comprises a processor 12, a memory 14, a plurality of input devices 16, and a plurality of output devices 18. The plurality of input devices 16 comprise a keyboard/touchpad 20, a fingerprint sensor 22, a microphone 24, a retina scanner 26, and a variety of other input devices which are commonly known in the art. At least one of the plurality of input devices 16 is required in the system 10, although more than one of the plurality of input devices 16 may also be present. The plurality of output devices 18 comprise a visual display 30 (e.g., a liquid crystal display), a speaker 32, and a variety of other output devices which are commonly known in the art. At least one of the plurality of output devices 18 is required in the system 10, although more than one of the plurality of output devices 18 may also be present. The system 10 is preferably implemented within a mobile phone or personal digital assistant (PDA), although the present invention is not limited in this regard.

The system 10 operates to a large extent by processing input data provided by the one or more input devices 16 and generating output data for the one or more output devices 18. The processor 12 processes the input data and generates the output data based upon instructions in software program(s) that are stored in the memory 14. The memory 14 also stores encrypted data such as, for example, encrypted personal identification number (PIN) codes, that is to be securely stored in accordance with the present invention.

In the exemplary case of securely storing one or more PIN codes, a user of the system 10 enters the one or more PIN codes and a reminder code through one of the plurality of input devices 16. For example, the user may type/punch a PIN code and a reminder code into the keyboard/touchpad 20. Alternatively, the user may recite a PIN code and a reminder code into the microphone 24. Alternatively still, the user may enter the one or more PIN codes and the reminder code through different means (e.g., a PIN code may be entered through the keyboard/touchpad 20, while the reminder code may be entered through the microphone 24). In any case, the processor 12 receives the one or more PIN codes and the reminder code from one or more of the plurality of input devices 16.

Either before or after the one or more PIN code and the reminder code have been entered, the user of the system 10 must also enter a personal identifier through one of the plurality of input devices 16. The personal identifier can take one of many different forms. For example, the personal identifier may be a compilation of alphanumeric characters that are typed/punched into the keyboard/touchpad 20. Alternatively, the personal identifier may be a compilation of alphanumeric characters or a term, phrase, or sound that is spoken or otherwise entered through the microphone 24. Alternatively still, the personal identifier may be a fingerprint of the user that is entered through the fingerprint sensor 22. Alternatively even still, the personal identifier may be an eye of the user that is entered through the retina scanner 26. Of course, the present invention is not limited to the above-described examples of personal identifiers. However, whatever form the personal identifier takes, it is received by the processor 12 from one or more of the plurality of input devices 16.

Figure 2:
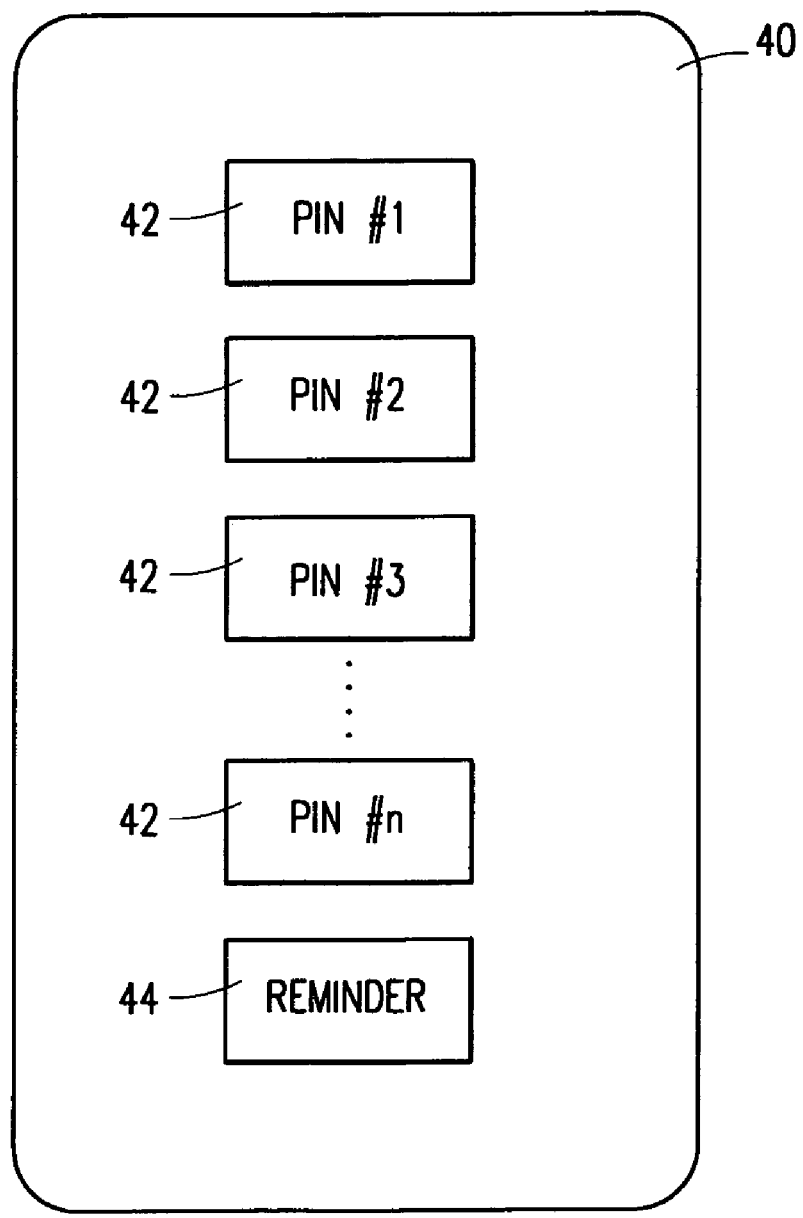
FIG. 2 is an illustration of a code bank within a memory of the system shown in FIG. 1.

Once the processor 12 receives the one or more PIN codes, the reminder code, and the personal identifier from one or more of the plurality of input devices 16, the processor 12 encrypts the one or more PIN codes and the reminder code using the personal identifier. That is, the processor 12 uses the personal identifier to encrypt the one or more PIN codes and the reminder code. The processor 12 then stores the one or more encrypted PIN codes and the encrypted reminder code in the memory 14. The portion of the memory 14 that stores the one or more encrypted PIN codes and the encrypted reminder code may be referred to as a code bank 40, as shown in FIG. 2. That is, the code bank 40 includes the one or more encrypted PIN codes 42 and the encrypted reminder code 44.

At this point it should be noted that the personal identifier is not stored in the memory 14 or by the processor 12. That is, after the processor 12 uses the personal identifier to encrypt the one or more PIN codes and the reminder code, the processor then deletes the personal identifier from the memory 14 (if the processor 12 temporarily stores the personal identifier within the memory 14) or from the processor 12 itself. Thus, the key for encrypting the one or more PIN codes and the reminder code (i.e., the personal identifier) is not stored within the system 10. This is an important feature of the present invention, as it insures that the system 10 is resistant to the various forms of attack listed above.

When the user of the system 10 wants to retrieve the one or more encrypted PIN codes from the memory 14, the personal identifier is required to decrypt the one or more encrypted PIN codes and the encrypted reminder code. That is, just as the user of the system 10 had to enter the personal identifier to encrypt the one or more PIN codes and the reminder code, the user of the system 10 also has to enter the personal identifier to decrypt the one or more encrypted PIN codes and the encrypted reminder code. Thus, the user of the system 10 enters the personal identifier through one of the plurality of input devices 16, and the processor 12 then uses the personal identifier to decrypt the one or more encrypted PIN codes and the encrypted reminder code. The one or more decrypted PIN codes and the decrypted reminder code are provided to the user through one of the plurality of output devices 18. For example, the one or more decrypted PIN codes and the decrypted reminder code may be provided to the user through the visual display 30 (e.g., a liquid crystal display) or through the speaker 32. Of course, the present invention is not limited to the above-described examples of output devices.

The decrypted reminder code acts as an indication to the user of system 10 that the one or more decrypted PIN codes are in fact a reproduction of the original pre-encrypted PIN codes. That is, if the user of the system 10 recognizes the decrypted reminder code as the pre-encrypted reminder code, then the user of the system 10 can be confident that the one or more decrypted PIN codes are in fact a reproduction of the original pre-encrypted PIN codes. On the other hand, if the user of the system 10 does not recognize the decrypted reminder code as the pre-encrypted reminder code, then the user of the system 10 understands that the one or more decrypted PIN codes are not a reproduction of the original pre-encrypted PIN codes. That is, if an incorrect personal identifier is entered when trying to decrypt the one or more encrypted PIN codes and the encrypted reminder code, then the processor 12 will decrypt the one or more encrypted PIN codes and the encrypted reminder code based upon this incorrect personal identifier and the one or more decrypted PIN codes and the decrypted reminder code that are subsequently provided to the user of the system 10 will not be a reproduction of the original pre-encrypted PIN codes and the original pre-encrypted reminder code. This is an important feature of the present invention, as it only allows the true user of the system 10 to know whether the one or more decrypted PIN codes are in fact reproductions of the original pre-encrypted PIN codes since only the true user of the system 10 should know the original pre-encrypted reminder code. Thus, this important feature of the present invention also insures that the system 10 is resistant to the various forms of attack listed above.

Figure 3:
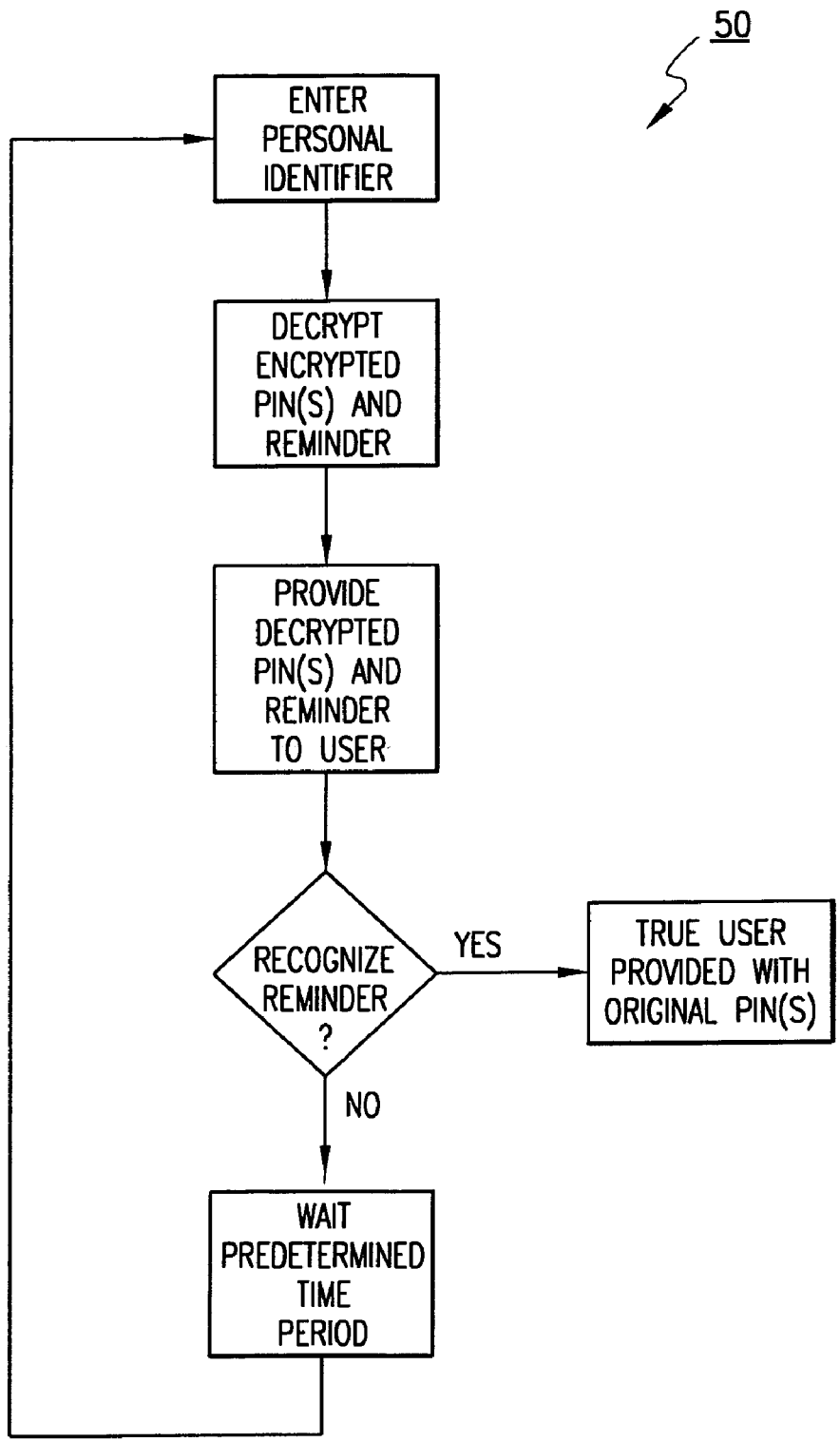
FIG. 3 is a flowchart detailing the method used to decrypt one or more encrypted PIN codes and an encrypted reminder code in accordance with the present invention.

Another important feature of the present invention that may further insure that the system 10 is resistant to the various forms of attack listed above is the inclusion of a timer program that may be stored in the memory 14 and run by the processor 12. For example, after every attempt to enter a personal identifier, the processor 12 may prevent another attempt for a predetermined period of time (e.g., 10 minutes). This would only allow an attacker 6 attempts per hour to try to crack the system 10. Referring to FIG. 3, there is shown a flowchart 50 detailing the method used to decrypt the one or more encrypted PIN codes and the encrypted reminder code, which incorporates this further important feature in accordance with the present invention.

To summarize the forgoing, by encrypting the PIN codes with a personal identifier, the system 10 is resistant to attacks 2 and 4 as described above. Also, by not storing the personal identifier in the system 10 (for verification purposes or otherwise), the system 10 is resistant to attacks 1 and 2 as described above. Further, by requiring that a subsequent personal identifier be entered only after a predetermined time period has elapsed, the system 10 is resistant to attack 3 as described above.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

What is claimed is:

1. A method for securely storing data within a memory, the method comprising the steps of:

receiving a reminder entered by a user;

encrypting the data using a non-verifiable personal identifier;

encrypting the user-entered reminder using the non-verifiable personal identifier; and storing the encrypted data and the encrypted user-entered reminder in the memory;

wherein the stored encrypted data and the stored encrypted user-entered reminder can only be correctly decrypted using the non-verifiable personal identifier, wherein a correctly decrypted reminder provides an indication of correctly decrypted data.

2. The method as defined in claim 1, wherein the data is one or more personal identification codes.

3. The method as defined in claim 1, wherein the user-entered reminder is a user-identifiable code.

4. The method as defined in claim 1, wherein the non-verifiable personal identifier is not stored in the memory.

5. The method as defined in claim 4, wherein the non-verifiable personal identifier comprises alphanumeric characters.

6. The method as defined in claim 4, wherein the non-verifiable personal identifier comprises an identifiable personal characteristic.

7. The method as defined in claim 6, wherein the identifiable personal characteristic comprises one of a human voice, a human fingerprint, and a human eye.

8. The method as defined in claim 4, further comprising the step of:

applying the non-verifiable personal identifier against the stored encrypted data and the stored encrypted user-entered reminder so as to decrypt the stored encrypted data and the stored encrypted user-entered reminder.

9. The method as defined in claim 8, further comprising the step of:
providing the data after being correctly decrypted using the using the non-verifiable personal identifier.

10. The method as defined in claim 9, wherein the data is displayed.

11. The method as defined in claim 9, wherein the data is announced.

12. The method as defined in claim 8, further comprising the step of:
providing the user-entered reminder after being correctly decrypted using the using the non-verifiable personal identifier.

13. The method as defined in claim 12, wherein the user-entered reminder is displayed.

14. The method as defined in claim 12, wherein the user-entered reminder is announced.

15. The method as defined in claim 8, further comprising the step of:
waiting a predetermined time period before applying another personal identifier against the stored encrypted data and the stored encrypted user-entered reminder for the purpose of decrypting the stored encrypted data and the stored encrypted reminder.

16. The method as defined in claim 1, further comprising the step of:
applying an identifier other than the non-verifiable personal identifier against the stored encrypted data and the stored encrypted reminder so as to incorrectly decrypt the stored encrypted data and the stored encrypted reminder.

17. The method as defined in claim 16, further comprising the step of:
providing incorrect data after the encrypted data has been incorrectly decrypted using an identifier other than the non-verifiable personal identifier.

18. The method as defined in claim 17, wherein the incorrect data is displayed.

19. The method as defined in claim 17, wherein the incorrect data is announced.

20. The method as defined in claim 16, further comprising the step of:
providing an incorrect reminder after the encrypted reminder has been incorrectly decrypted using an identifier other than the non-verifiable personal identifier.

21. The method as defined in claim 20, wherein the incorrect reminder is displayed.

22. The method as defined in claim 20, wherein the incorrect reminder is announced.

23. The method as defined in claim 16, further comprising the step of:
waiting a predetermined time period before applying another personal identifier against the stored encrypted data and the stored encrypted reminder for the purpose of decrypting the stored encrypted data and the stored encrypted reminder.

24. An apparatus for securely storing data within a memory, the apparatus comprising:
at least one processor configured to:
receive a reminder entered by a user;
encrypt the data using a non-verifiable personal identifier; and
encrypt the user-entered reminder using the non-verifiable personal identifier;
and a memory for storing the encrypted data and the encrypted user-entered reminder;
wherein the stored encrypted data and the stored encrypted reminder can only be correctly decrypted using the non-verifiable personal identifier, wherein a correctly decrypted reminder provides an indication of correctly decrypted data.

25. The apparatus as defined in claim 24, wherein the data is one or more personal identification codes.

26. The apparatus as defined in claim 24, wherein the user-entered reminder is a user-identifiable code.

27. The apparatus as defined in claim 24, wherein the non-verifiable personal identifier is not stored in the memory.

28. The apparatus as defined in claim 27, wherein the non-verifiable personal identifier comprises alphanumeric characters.

29. The apparatus as defined in claim 27, wherein the non-verifiable personal identifier comprises an identifiable personal characteristic.

30. The apparatus as defined in claim 29, wherein the identifiable personal characteristic comprises one of a human voice, a human fingerprint, and a human eye.

31. The apparatus as defined in claim 27, wherein the at least one processor is further configured to:
decrypt the stored encrypted data and the stored encrypted reminder with the non-verifiable personal identifier.

32. The apparatus as defined in claim 31, further comprising:
a output device for displaying the data after being correctly decrypted using the using the non-verifiable personal identifier.

33. The apparatus as defined in claim 31, further comprising:
an output device for announcing the data after being correctly decrypted using the using the non-verifiable personal identifier.

34. The apparatus as defined in claim 31, further comprising:
a output device for displaying the user-entered reminder after being correctly decrypted using the using the non-verifiable personal identifier.

35. The apparatus as defined in claim 31, further comprising:
an output device for announcing the user-entered reminder after being correctly decrypted using the using the non-verifiable personal identifier.

36. The apparatus as defined in claim 31, wherein the at least one processor is further configured to:
wait a predetermined time period before decrypting the stored encrypted data and the stored encrypted reminder with another personal identifier.

37. The apparatus as defined in claim 24, wherein the at least one processor is further configured to:
incorrectly decrypt the stored encrypted data and the stored encrypted reminder with an identifier other than the non-verifiable personal identifier.

38. The apparatus as defined in claim 37, further comprising:
an output device for displaying incorrect data after the encrypted data has been incorrectly decrypted using an identifier other than the non-verifiable personal identifier.

39. The apparatus as defined in claim 37, further comprising:
an output device for announcing incorrect data after the encrypted data has been incorrectly decrypted using an identifier other than the non-verifiable personal identifier.

40. The apparatus as defined in claim 37, further comprising:
an output device for displaying an incorrect reminder after the encrypted reminder has been incorrectly decrypted using an identifier other than the non-verifiable personal identifier.

41. The apparatus as defined in claim 37, further comprising:
an output device for announcing an incorrect reminder after the encrypted user-entered reminder has been incorrectly decrypted using an identifier other than the non-verifiable personal identifier.

42. The apparatus as defined in claim 37, wherein the at least one processor is further configured to:
wait a predetermined time period before decrypting the stored encrypted data and the stored encrypted reminder with another personal identifier.

43. An article of manufacture for securely storing data within a memory, the article of manufacture comprising:
at least one processor readable carrier; and
instructions carried on the at least one carrier; wherein the instructions are configured to be readable from the at least one carrier by at least one processor and thereby cause the at least one processor to operate so as to:
receive a reminder entered by a user;
encrypt the data using a non-verifiable personal identifier;
encrypt the user-entered reminder using the non-verifiable personal identifier; and
store the encrypted data and the encrypted user-entered reminder in the memory;
wherein the stored encrypted data and the stored encrypted reminder can only be correctly decrypted using the non-verifiable personal identifier, wherein a correctly decrypted reminder provides an indication of correctly decrypted data.

44. The article of manufacture as defined in claim 43, wherein the data is one or more personal identification codes.

45. The article of manufacture as defined in claim 43, wherein the user-entered reminder is a user-identifiable code.

46. The article of manufacture as defined in claim 43, wherein the non-verifiable personal identifier is not stored in the memory.

47. The article of manufacture as defined in claim 46, wherein the non-verifiable personal identifier comprises alphanumeric characters.

48. The article of manufacture as defined in claim 46, wherein the non-verifiable personal identifier comprises an identifiable personal characteristic.

49. The article of manufacture as defined in claim 48, wherein the identifiable personal characteristic comprises one of a human voice, a human fingerprint, and a human eye.

50. The article of manufacture as defined in claim 46, further causing the at least one processor to operate so as to:
apply the non-verifiable personal identifier against the stored encrypted data and the stored encrypted reminder so as to decrypt the stored encrypted data and the stored encrypted reminder.

51. The article of manufacture as defined in claim 50, further causing the at least one processor to operate so as to:
provide the data after being correctly decrypted using the using the non-verifiable personal identifier.

52. The article of manufacture as defined in claim 51, wherein the data is displayed.

53. The article of manufacture as defined in claim 51, wherein the data is announced.

54. The article of manufacture as defined in claim 50, further causing the at least one processor to operate so as to:
provide the user-entered reminder after being correctly decrypted using the using the non-verifiable personal identifier.

55. The article of manufacture as defined in claim 54, wherein the user-entered reminder is displayed.

56. The article of manufacture as defined in claim 54, wherein the user-entered reminder is announced.

57. The article of manufacture as defined in claim 50, further causing the at least one processor to operate so as to:
wait a predetermined time period before applying another personal identifier against the stored encrypted data and the stored encrypted reminder for the purpose of decrypting the stored encrypted data and the stored encrypted reminder.

58. The article of manufacture as defined in claim 43, further causing the at least one processor to operate so as to:
apply an identifier other than the non-verifiable personal identifier against the stored encrypted data and the stored encrypted reminder so as to incorrectly decrypt the stored encrypted data and the stored encrypted reminder.

59. The article of manufacture as defined in claim 58, further causing the at least one processor to operate so as to:
provide incorrect data after the encrypted data has been incorrectly decrypted using an identifier other than the non-verifiable personal identifier.

60. The article of manufacture as defined in claim 59, wherein the incorrect data is displayed.

61. The article of manufacture as defined in claim 59, wherein the incorrect data is announced.

62. The article of manufacture as defined in claim 58, further causing the at least one processor to operate so as to:
provide an incorrect reminder after the encrypted user-entered reminder has been incorrectly decrypted using an identifier other than the non-verifiable personal identifier.

63. The article of manufacture as defined in claim 62, wherein the incorrect reminder is displayed.

64. The article of manufacture as defined in claim 62, wherein the incorrect reminder is announced.

65. The article of manufacture as defined in claim 58, further causing the at least one processor to operate so as to:
wait a predetermined time period before applying another personal identifier against the stored encrypted data and the stored encrypted reminder for the purpose of decrypting the stored encrypted data and the stored encrypted reminder.

* * * * *

UNITED STATES PATENT AND TRADEMARK OFFICE
CERTIFICATE OF CORRECTION

PATENT NO. : 6,938,163 B1 Page 1 of 1
APPLICATION NO. : 09/525230
DATED : August 30, 2005
INVENTOR(S) : Birkler et al.

It is certified that error appears in the above-identified patent and that said Letters Patent is hereby corrected as shown below:

On the Title Page, in Item (56), Under "Assistant Examiner" in Column 2, Line 1, delete "Andrew Nalven" and insert -- Andrew L Nalevn --, therefor.

In Column 7, Line 4, in Claim 9, delete "using the" before "non-verifiable".

In Column 7, Line 12, in Claim 12, delete "using the" before "non-verifiable".

In Column 8, Line 29, in Claim 32, delete "using the" before "non-verifiable".

In Column 8, Line 34, in Claim 33, delete "using the" before "non-verifiable".

In Column 8, Line 39, in Claim 34, after "using the" delete "using the".

In Column 8, Line 45, in Claim 35, delete "using the" before "non-verifiable".

In Column 10, Line 4, in Claim 51, delete "using the" before "non-verifiable".

In Column 10, Line 12, in Claim 54, delete "using the" before "non-verifiable".

Signed and Sealed this

Twentieth Day of November, 2007

JON W. DUDAS
*Director of the United States Patent and Trademark Office*